May 30, 1950      J. ANDERSON, JR      2,509,467
MACHINE FOR ASSEMBLING STORAGE BATTERY PLATES
Filed Sept. 15, 1947      11 Sheets-Sheet 1

Inventor
James Anderson, Jr.
By Stuart M. Maule
Attorney

Inventor
James Anderson, Jr.
By Stuart M. Maule
Attorney

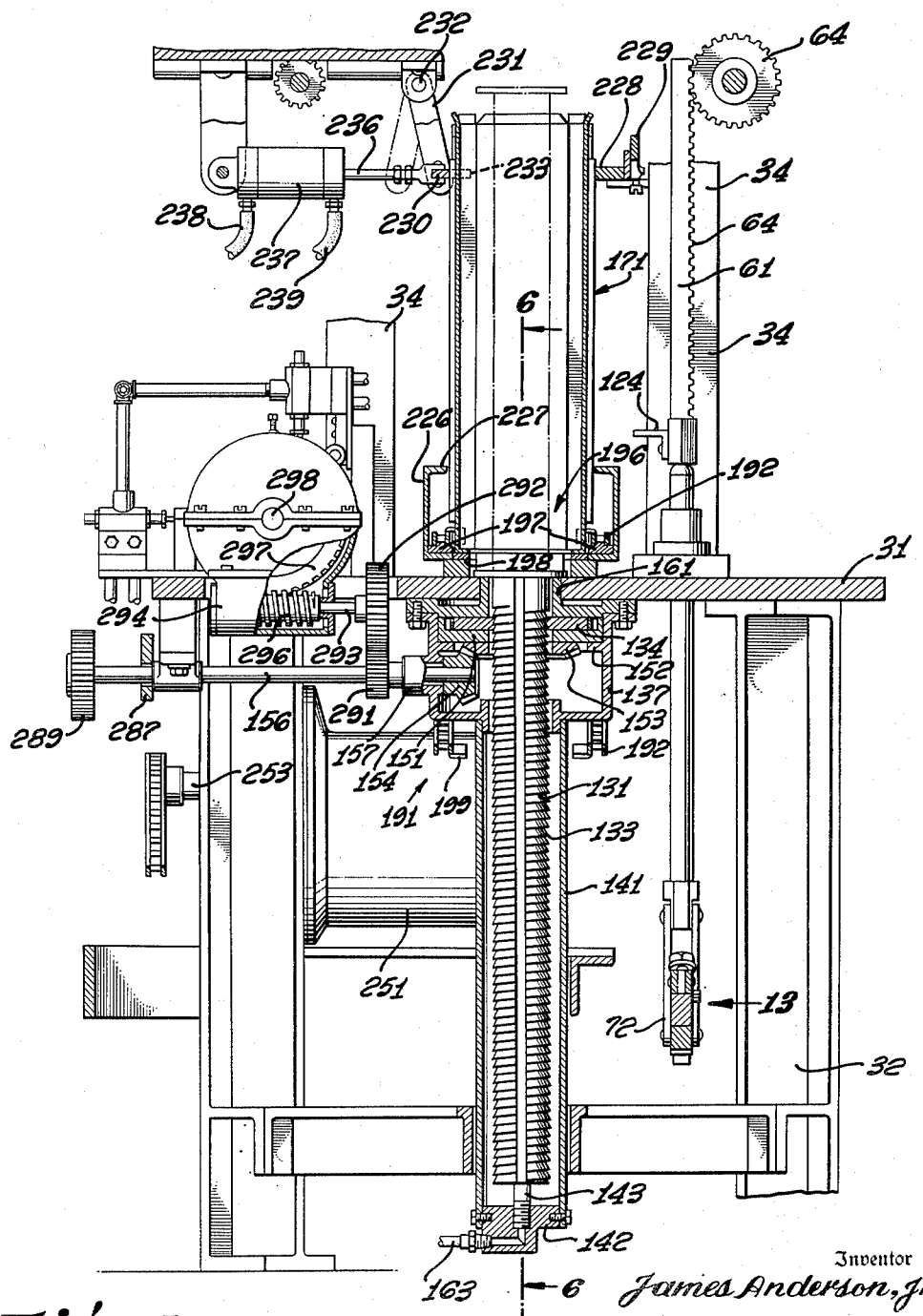

May 30, 1950     J. ANDERSON, JR     2,509,467
MACHINE FOR ASSEMBLING STORAGE BATTERY PLATES
Filed Sept. 15, 1947     11 Sheets-Sheet 6
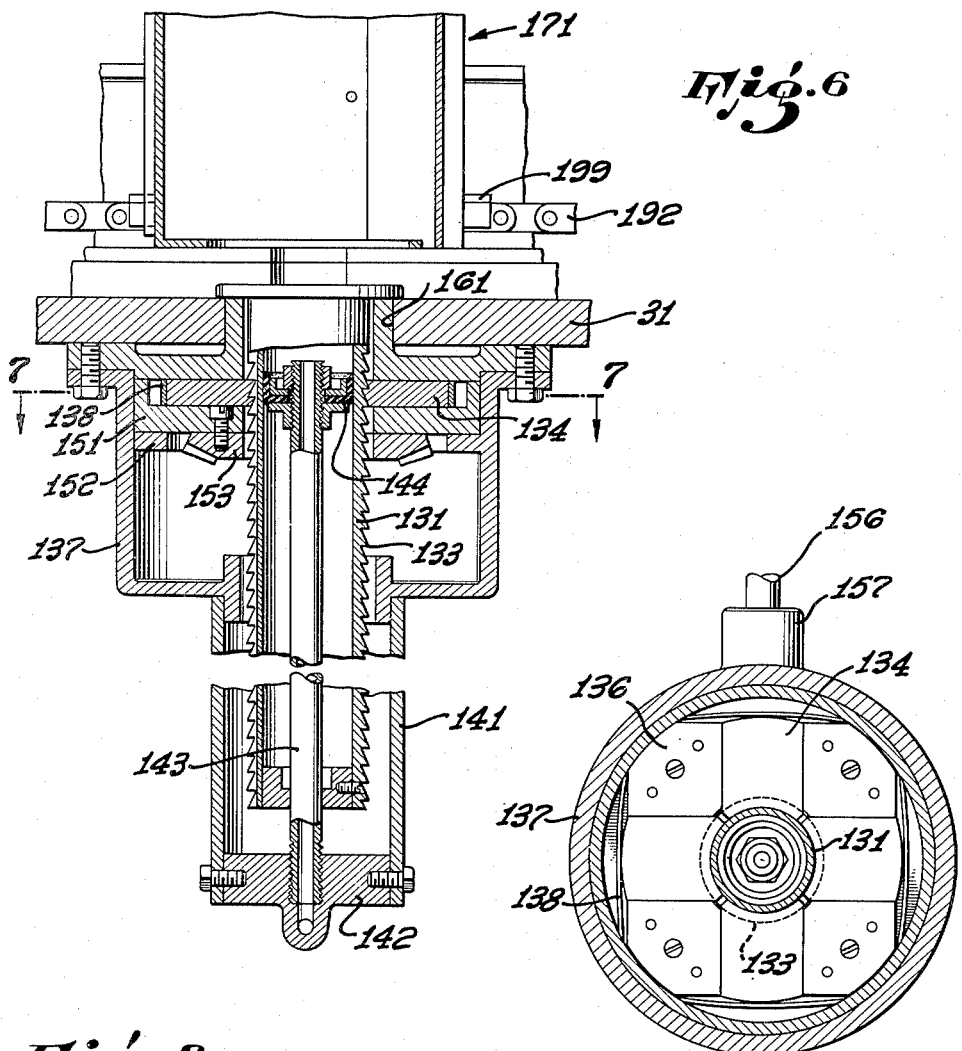
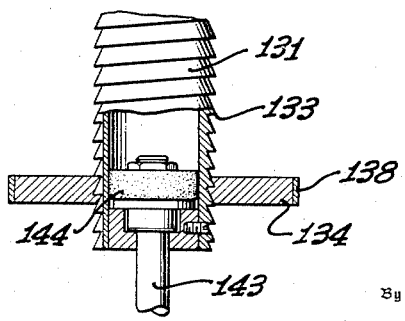
Inventor
James Anderson, Jr.
By Stuart M. Maule
Attorney May 30, 1950     J. ANDERSON, JR     2,509,467
MACHINE FOR ASSEMBLING STORAGE BATTERY PLATES
Filed Sept. 15, 1947     11 Sheets-Sheet 7
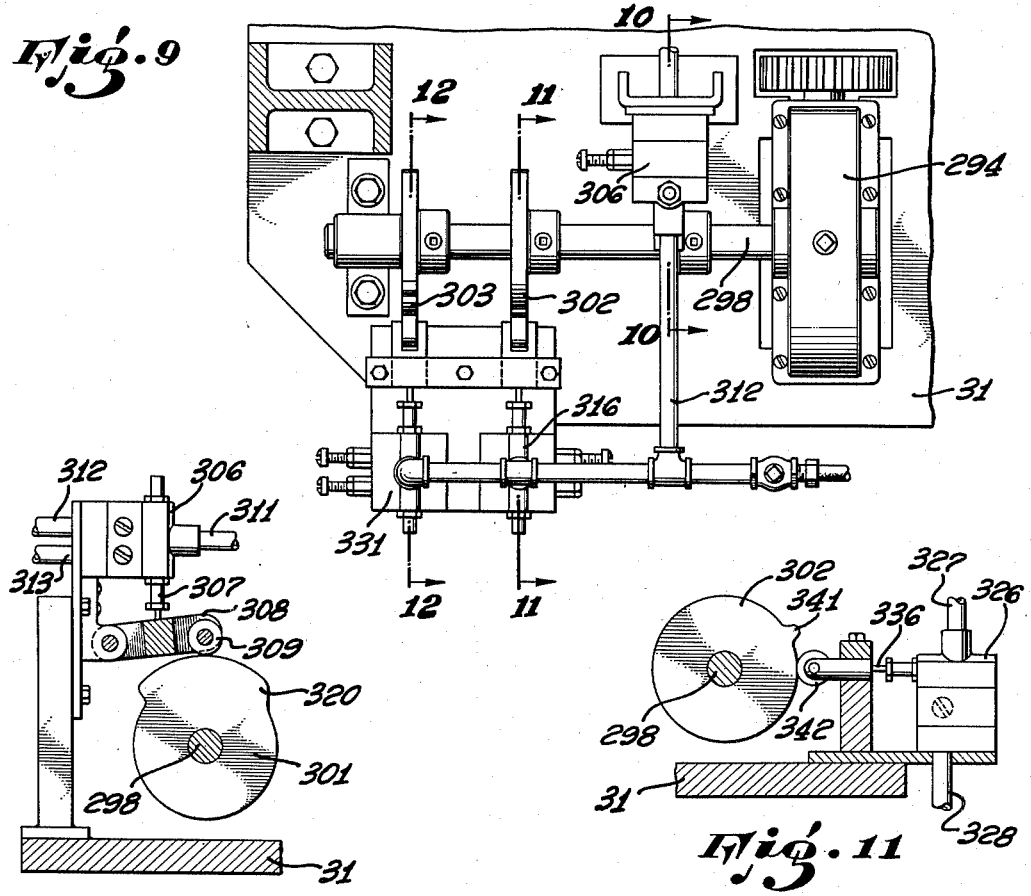
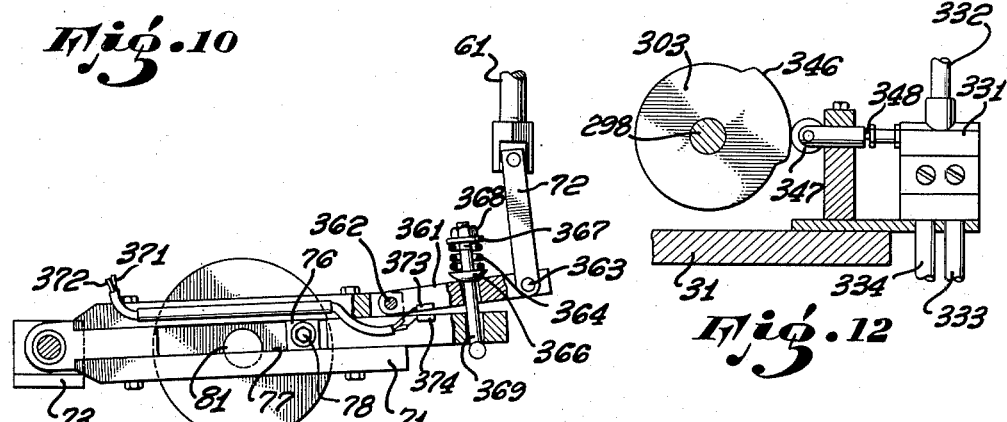
Inventor
James Anderson, Jr.
By
Stuart M. Maule
Attorney May 30, 1950 J. ANDERSON, JR 2,509,467
MACHINE FOR ASSEMBLING STORAGE BATTERY PLATES
Filed Sept. 15, 1947 11 Sheets-Sheet 8

Inventor
James Anderson, Jr.
By
Attorney

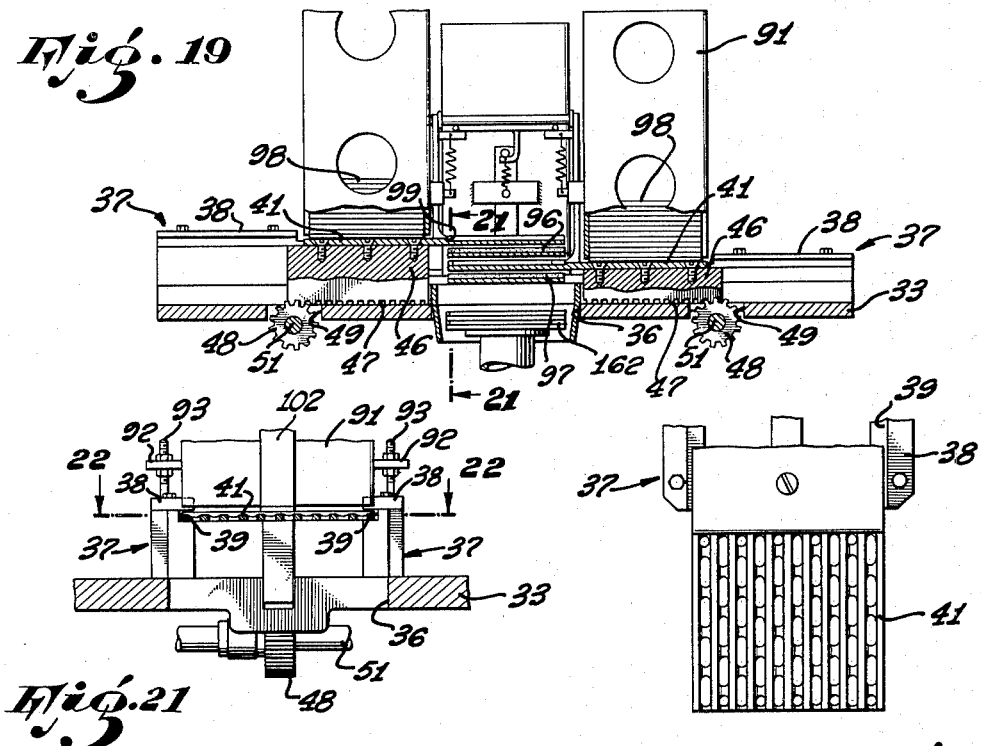
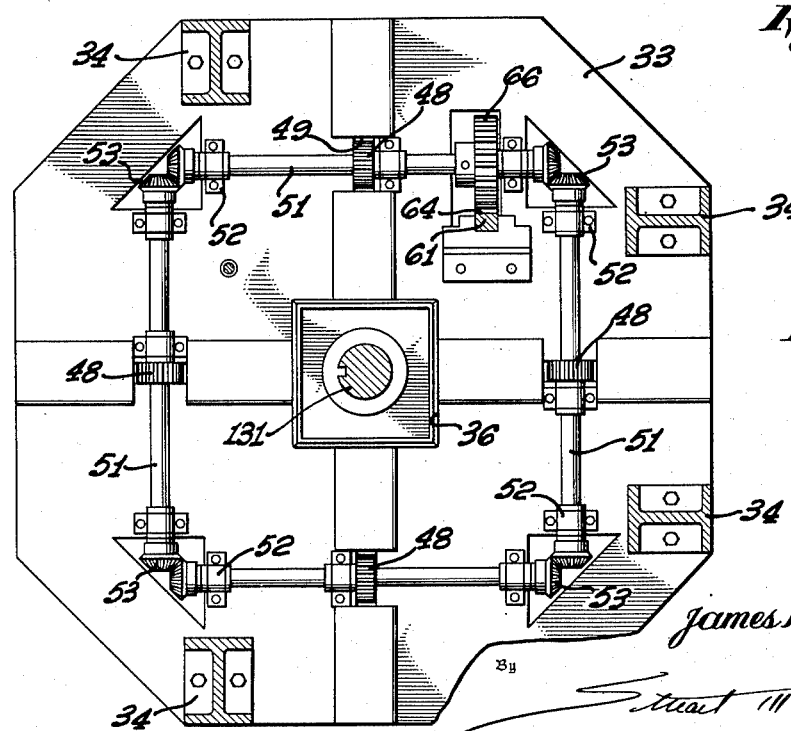

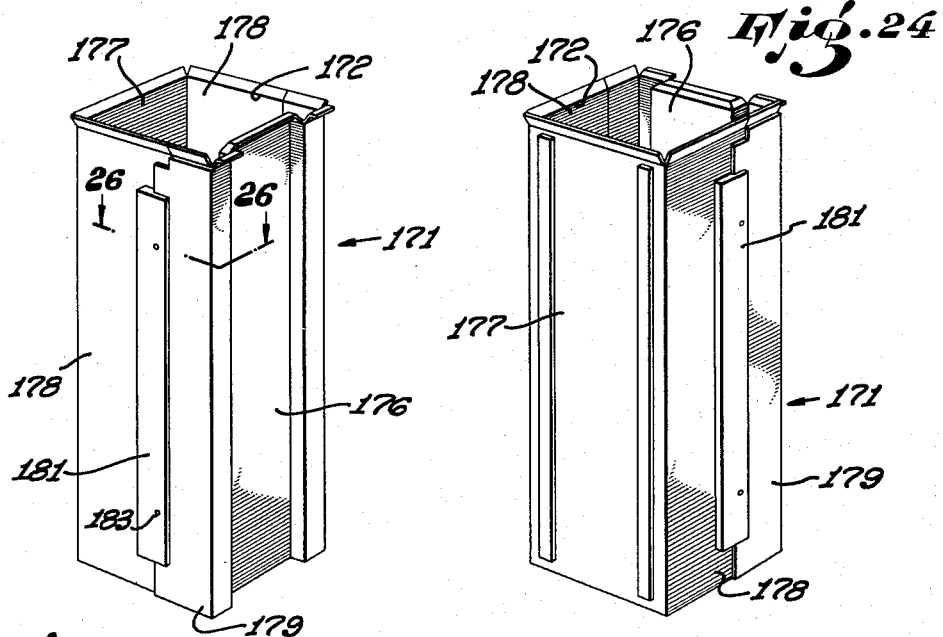
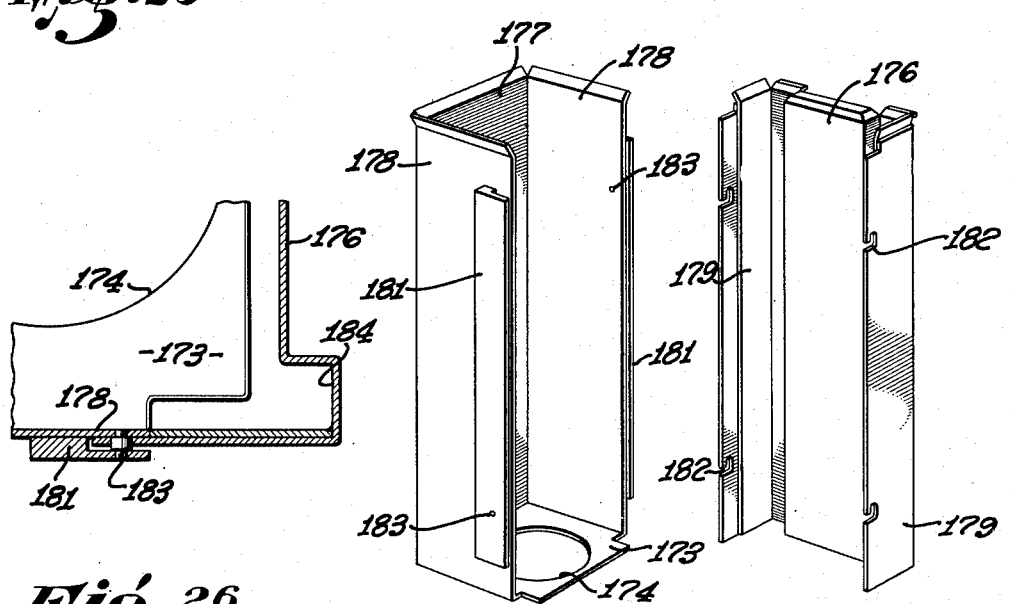

May 30, 1950 J. ANDERSON, JR 2,509,467
MACHINE FOR ASSEMBLING STORAGE BATTERY PLATES
Filed Sept. 15, 1947 11 Sheets-Sheet 11
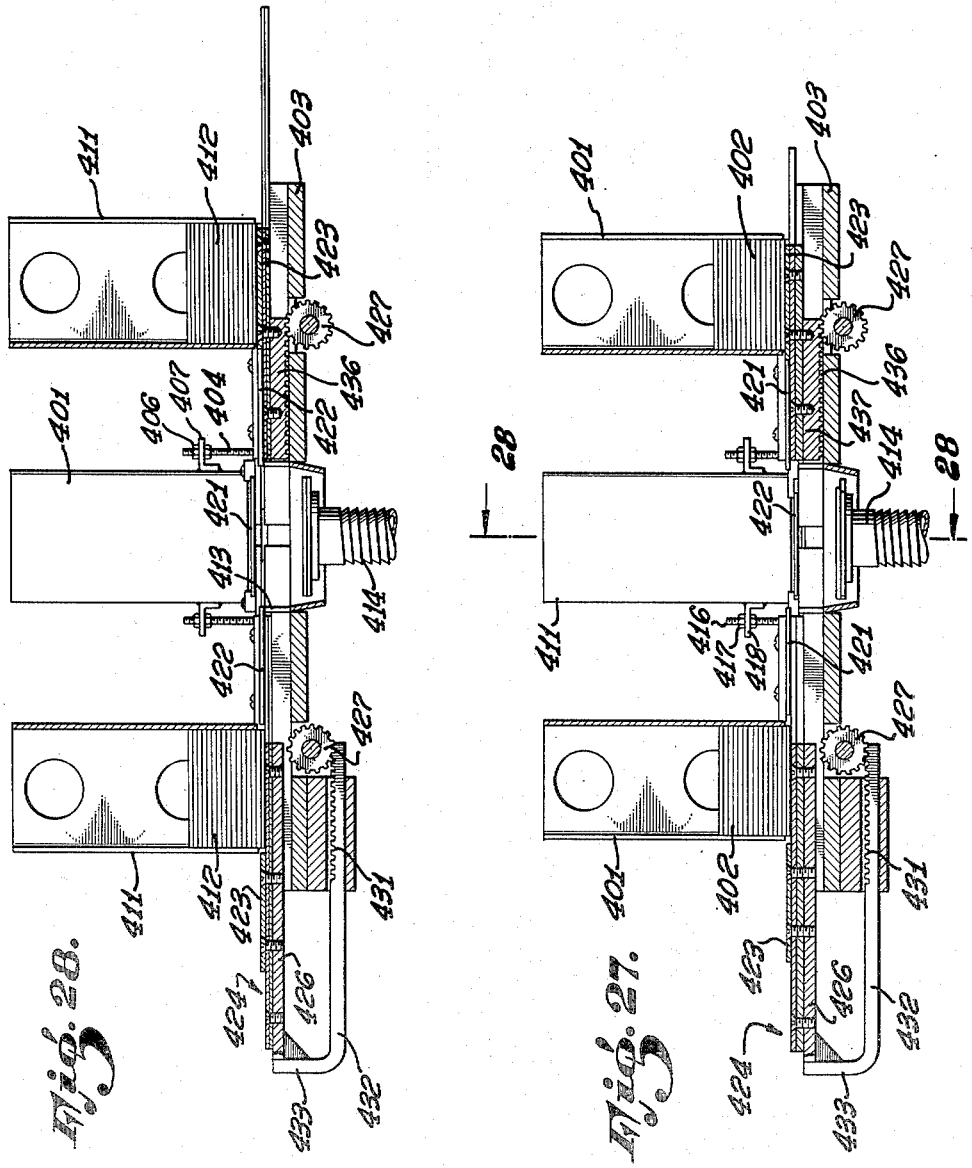

Patented May 30, 1950

2,509,467

UNITED STATES PATENT OFFICE 2,509,467

MACHINE FOR ASSEMBLING STORAGE BATTERY PLATES

James Anderson, Jr., Los Angeles, Calif.

Application September 15, 1947, Serial No. 773,985

9 Claims. (Cl. 226—16)

This invention relates to apparatus for assembling parts into groups wherein the assembled parts occur in predetermined sequence and predetermined manner of interrelationship, and more particularly to an apparatus for assembling storage battery plates as a part of the process of manufacturing storage batteries.

It is now common practice in the manufacture of storage batteries to form the cell units by telescoping the plates of a previously constructed positive grid plate assembly between the plates of a negative grid plate assembly. In other instances, an appropriate number of grid plates of both polarities are arranged alternately with their respective lugs disposed in two spaced rows, permitting an operator to weld or "burn" the proper number of plates of like polarity into plate assemblies, the plates of which are properly positioned between the plates of an assembly of opposite polarity. Regardless of the manner of production of the plate assemblies, thereafter the separator plates must be interposed between each two adjacent grid plates. This manner of producing cell units is disadvantageous for numerous reasons, among them being the relative difficulty encountered in positioning the separator plates accurately with respect to the positive and negative grid plates which, in view of the restricted space intervening between each two adjacent grid plates, often is difficult and requires forcing and pounding to the extent that the separator plates frequently are damaged and the oxide loosened from the grid plates. Also, separate assembling and interconnection, or "burning," of the plates defining the cell assemblies of the two polarities is conventionally performed by hand which not only is laborous and relatively expensive, but also is conducive to error because it requires that the operator keep accurate count of the number of plates being placed in each assembly so as to assure that the proper number of plates of each polarity is included in each cell unit.

It is an object of the present invention, therefore, to provide an assembling machine of the general class indicated which is adapted to assemble positive grid plates, negative grid plates, and separator plates into stacked relation in which the assembled plates are disposed in the proper sequence, i. e., in that sequence within which they are to appear in the final storage batteries and thus avoid the necessity of inserting the separator plates and consequently also avoid the liability of damage to the cell units in the manner hereinabove pointed out.

It is a further object of the present invention to provide a storage battery plate assembling machine of the character described which is adapted to arrange the plates in predetermined order and thus stack them within a suitable magazine which not only affords convenience in transporting the assembled plates from place to place and to preserve their orderly arrangement, but which also adapts the assembled plates particularly to be supplied to the storage battery plate grouping machine forming the subject matter of my copending application, Serial No. 750,446, filed May 26, 1947, now Patent Number 2,505,514, dated April 26, 1950.

A further object is to provide an assembling machine of the character described which is fully automatic, requiring only that its several storage bins be kept supplied with the several types of plates required and the empty magazines into which the plates are to be stacked in order for it to operate continuously to provide a supply of magazines, each file with the proper number of properly arranged grid plates and separator plates for preferably a plurality of complete storage batteries.

This invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

The machine of my present invention for assembling storage battery grid plates and separator plates into predetermined sequence and for stacking them within magazines for facile subsequent handling is shown by way of illustration in the accompanying drawings, in which:

Figure 5 is a transverse, vertical, medial sectional view, the plane of section being indicated by the line 5—5 of Figure 2 and the direction of view by the arrows.

Figure 6 is a more highly enlarged detail view, taken in longitudinal vertical section upon the line 6—6 of Figure 5 with the direction of view as indicated, a portion of the figure being broken away to reduce its size.

Figure 7 is a detail view in horizontal section, taken upon the line 7—7 of Figure 6, with the direction of view as indicated.

Figure 8 is a detail view showing a portion of the mechanism for raising and lowering the plate receiver, portions of the figure being broken away and shown in sections to reveal the internal structure.

Figure 9 is an enlarged detail view in top elevation of the valves for controlling flow of the motivating hydraulic fluid and the cams for timing and synchronizing them. This view is taken in the direction of arrow 9 of Figure 4.

Figure 10 is a transverse vertical sectional view taken upon the line 10—10 of Figure 9, with the direction of view as indicated, to show valve and associated cam for controlling operation of the clutch mechanism and plate-withdrawing shuttles.

Figure 11 is a view similar to Figure 10, taken upon the line 11—11 of Figure 9, with the direction of view as indicated, showing the valve and cam for controlling operation of the receiver.

Figure 12 is another view similar to Figure 11, but taken upon the line 12—12 of Figure 9 with the direction of view as indicated, to show the valve and associated cam for controlling operation of the conveyor.

Figure 13 is a detail view in front elevation of the mechanism for reciprocating the shuttle-actuating rack. The direction of view is indicated by the arrows 13 of Figures 3 and 5.

Figure 14 is an enlarged detail view in front elevation of the plunger and associated rack for actuating the conveyor, the direction of view being indicated by the arrow 14 of Figure 1.

Figure 19 is a vertical sectional view taken upon the line 19—19 of Figure 17 with the direction of view as indicated.

Figure 20 is a horizontal sectional view looking upwards against the under surface of the upper platform, the plane of section being indicated by the line 20—20 of the Figure 18, and the direction of view by the arrows.

Figure 21 is a more highly enlarged detail view taken in vertical section upon the line 21—21 of Figure 19, with the direction of view as indicated.

Figure 22 is a detail plan view of one of the plate-withdrawing shuttles. This may be considered a sectional view taken upon the line 22—22 of Figure 21, in the direction of view as indicated.

Figure 23 is a perspective view showing the top and one side of one of the magazines within which the assembling machine is adapted to stack the battery plates.

Figure 24 is a perspective view showing the bottom of the magazine of Figure 23.

Figure 25 is a perspective view of the magazine of Figures 23 and 24, but showing the top of the magazine separated from the bottom.

Figure 26 is an enlarged detail view in horizontal section taken upon the line 26—26 of Figure 23, with the direction of view as indicated.

Figure 27 is a view similar to Figure 18, showing a slightly modified form of shuttle mechanism.

Figure 28 is a view similar to Figure 19, but taken on a plane perpendicular to that of Figure 27 on the line 28—28 of that figure, with the direction of view as indicated.

Figure 1:
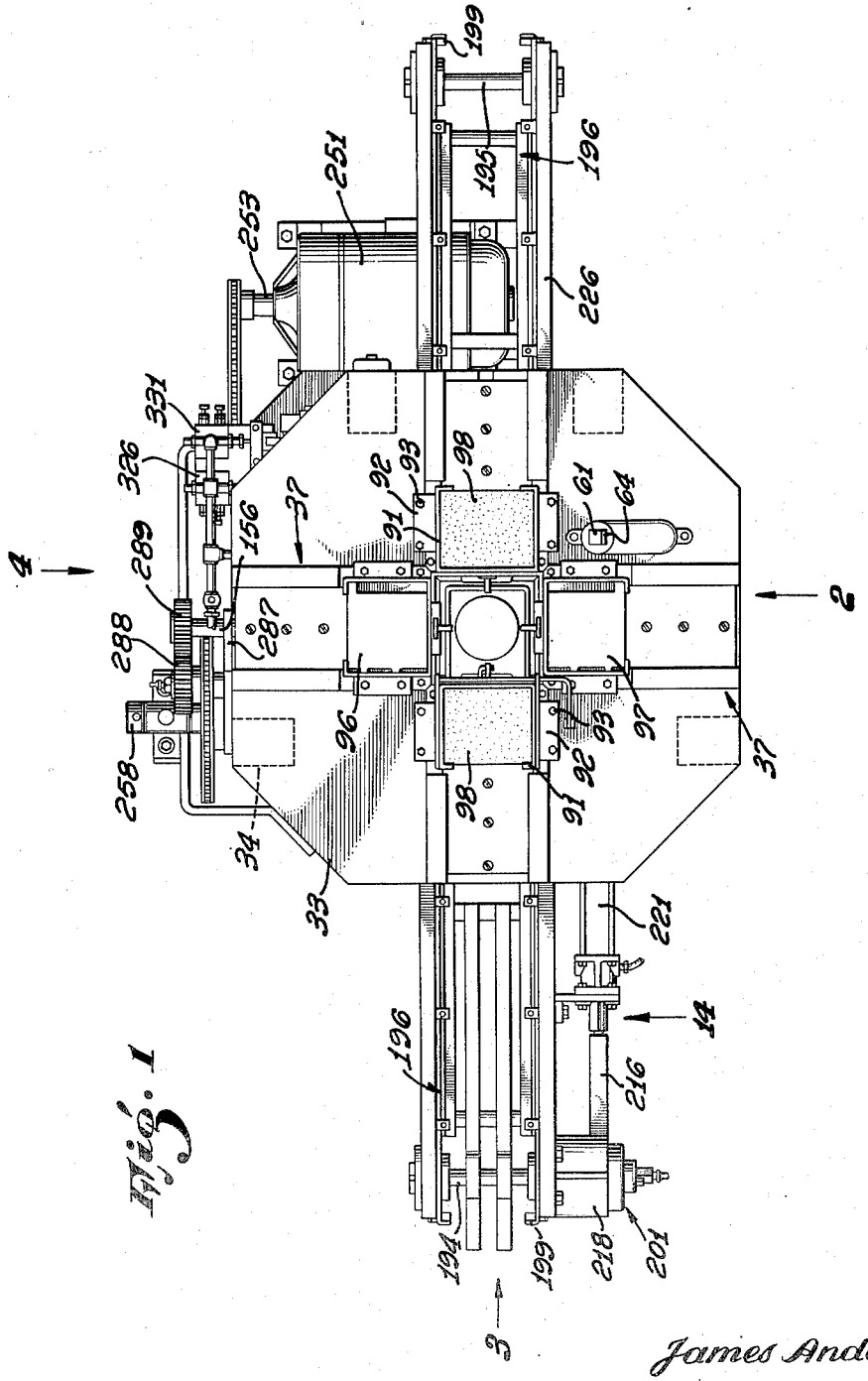
Figure 1 is a top plan view of the machine.

In its preferred embodiment, the assembling machine of the present invention may, for convenience in its description, be considered as comprising the following main groups of mechanisms:

1. The shuttle mechanism for withdrawing grid plates and separator plates in the proper sequence from their respective storage bins.

2. The receiver upon which the shuttle mechanism deposits the plates and which places them within magazines in suitable arrangement for them to be fed into the "burning machine" of my aforesaid co-pending application.

3. The mechanism for conveying the empty magazines into the assembling machine and the filled magazines from the machine, and the mechanism for locating the magazines accurately in proper position within the machine while plates are being delivered thereinto by the receiver.

4. The driving mechanism.

5. The timing or synchronizing mechanism.

The frame of the machine is illustrated as comprising a lower platform 31 supported by legs 32 and an upper platform 33, the supporting legs 34 of which are in turn supported upon the lower platform 31.

*The shuttle mechanism*

The shuttle mechanism is best illustrated in Figures 17 to 20, inclusive, and is operably supported upon the upper platform 33 which is provided with a central opening 36 from which four guideways 37 extend medially. Each of these guideways 37 comprises a pair of parallel tracks 38, the upper inner edge of which is provided with an inwardly-opening, longitudinally-extending recess or groove 39. The two grooves 39 of each pair of associated tracks 38 has a shuttle plate 41 slidably mounted therein for reciprocatory movement in a path extending radially outwards from the central opening 36 in the upper platform 33. The tracks 38 of each guideway 37 are of a different height above the platform 33 than the tracks 38 of any of the other three guideways 37, with the result that each of the shuttle plates 41 operates within a horizontal plane and an elevation different from that within which any of the other shuttle plates operates. The purpose of this arrangement is to permit all of the shuttle plates 41 to move radially inwards to assume positions over the central opening 36 simultaneously without the development of any interference between shuttle plates 41 or the grid plates and separator plates carried thereby.

Secured to the under surface of each of the shuttle plates 41 is a rack 46, the teeth 47 of which are engaged by a pinion gear 48, the upper portion of which extends upwards through a suitably positioned opening 49 in the platform 33, it being understood that one such pinion gear 48 is provided for each of the four shuttle plates 41.

Means are provided for simultaneously rotating all of the gears 48 alternately in opposite directions. As is best shown in Figure 20, each of the gears 48 is carried by a shaft 51 revolubly mounted by journals 52 secured in such position to the under surface of the platform 33 that the shaft 51 of each gear 48 extends perpendicularly with respect to the guideway 37 with which the gear 48 carried by that shaft 51 is associated. Each of the four shafts 51 is provided with a bevel gear 53 on each end thereof, each of these bevel gears being enmeshed with the similar bevel gear 53 on the adjacent end of another of the shafts 51, the four of which are arranged substantially in a square so as to position their ends closely adjacent to each other.

A vertically extending rack bar 61 is reciprocably mounted in upper and lower bearings 62 and 63, respectively, rigidly mounted upon the upper and lower platforms 33 and 31, respectively. The teeth 64 of the rack bar 61 are enmeshed with a driven pinion gear 66 rigidly secured to one of the horizontal shafts 51, with the result that when that bar 61 is moved upwards all of the shafts 51 and their respective gears 48 are rotated in one direction; and when the rack bar 61 moves downwards, all of the shafts 51 and their respective gears 48 are moved in the opposite direction. In the modification illustrated, the rack bar 61 is disposed inside the square defined by the four shafts 51, with the result that when the rack bar 61 moves upwards, the several gears 48 are rotated in that direction which causes their respective shuttle plates 41 all to move outwards and, of course, in the opposite direction when the rack bar 61 moves downwards.

The means for reciprocating the rack bar 61 comprises a lever 71 disposed below the lower platform 31 and connected at one end as by a link or connecting rod 72 with the lower end of the rack bar 61. The other end of the lever 71 is pivotally mounted upon a suitable bracket 73 rigid with one of the legs 32. A cross head, or slipper block 76 is slidable within a longitudinally extending guideway 77 in the lever 71; and this cross head 76 is carried by a crank pin 78 which is rigid with a disc 79 carried at one end of a drive shaft 81. Accordingly, when the shaft 81 and its disc 79 are rotated, the lever 71 is caused to reciprocate in pivotal motion about the axis of its mounting upon the bracket 73, moving the rack bar 61 in vertical reciprocatory movement and thereby reciprocating all four shuttle plates 41 simultaneously.

A storage bin 91 is rigidly mounted above the inner end of each of the guideways 37, each of these bins 91 being of substantially rectangular horizontal section and having outwardly extending base flanges 92 through which extends studs 93 or other suitable fastening means whereby the bin 91 is mounted in position on the upper surface of the upper platform 33. Each of the bins 91 is open at both its upper and lower ends, the open upper end permitting a supply of plates to be placed within the bin, and the open lower end permitting those plates to be withdrawn one at a time from the bin as regulated by the associated shuttle plate 41. Two of the storage bins, preferably on opposite sides of the central opening 36, are proportioned to receive conventional storage battery grid plates 96 and 97, whereas the other two storage bins 91 are adapted to receive conventional storage battery separator plates 98.

Figure 18:
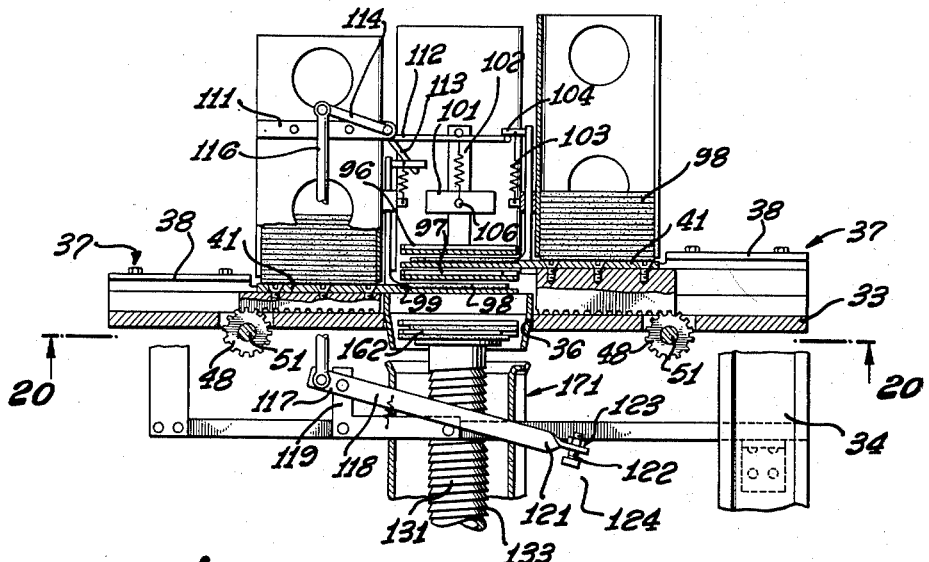
Figure 18 is a vertical sectional view taken upon the line 18—18 of Figure 17, with the direction of view as indicated.

As is best shown in Figure 18, the inner end of each shuttle plate 41 is provided with a recess 99 on its upper surface and at its inner end, this recess substantially corresponding in shape and size to the type of plate 96, 97 or 98, as the case might be, for which its associated storage bin 91 is intended. Consequently, when the shuttle plates 41 are drawn outwards in their respective guideways 37, the lowermost plate in each of the four storage bins 91 will drop into the recess 99 of the associated shuttle plate 41, assuming a position slightly below the extreme lower edge of the inner wall of the associated storage bin 91. A portion of the next plate thereabove, however, is still at an elevation above the horizontal plane of the lower edge of the inner wall of the associated bin, with the result that when the shuttle plates 41 are moved inwards again, each carries one of the plates from the associated storage bin, but all of the other plates stored within that bin are retained within the bin. Sufficient clearance is provided between the several horizontal planes of operation of the four shuttle plates 41 to permit them all to move radially inwards, carrying with them their respective single plates 96, 97 or 98, without interference; and the parts are so proportioned that when they are at their innermost extreme of movement the shuttle plates 41 dispose the four plates carried thereby directly above the central opening 36 in the upper platform 33. Inasmuch as the four shuttle plates operate in horizontal planes which are progressively higher in their positions of angular spacing clockwise around the vertical axis of the central opening 36, the lowermost being associated with a bin for separator plates, the next thereabove with a bin for a grid plate of, say, negative polarity, the next thereabove with a bin for separator plates, and the uppermost with a bin for grid plates of the opposite polarity, the plates that are thus permitted through this central opening 36 are automatically arranged in that sequence with respect to each other within which it is desired for them to occur in the final completed battery.

Means are provided for retaining the plates so positioned above the central opening against being retracted by their shuttle plates 41 when the shuttle plates are withdrawn so as to permit these plates to drop through the central opening 36 and onto the receiver presently to be described, in the order which they have assumed with respect to each other when moved radially inwards by their respective shuttle plates 41. A guiding bracket 101 rigid with that surface of each of the storage bins 91 which faces inwards slidably supports a bar 102 which is continuously urged downwards to its lowermost extreme of movement by a coil spring 103 under tension between an inwardly extending pin 104 on the upper end of the bar 102 and another pin 106 extending inwards from the associated guiding bracket 101. When in its lowermost extreme position, the lower end of each bar 102 rests upon the upper surface of the associated shuttle plate 41; consequently, after a grid plate or a separator plate, as the case might be, has been carried inwards to the limit of the associated shuttle plate's inward movement, the lower end of each bar will drop behind the trailing edge of that plate with the result that when the associated shuttle plate 41 is retracted, the associated bar 102 operates as a dog to retain the plate which has been carried inward by that shuttle plate and thereby avoid its being drawn back toward the associated storage bin.

Means are provided, however, for raising all four of the retaining dogs 102 for a brief interval while the shuttle plates 41 are adjacent their outer extremes of movement, this interval being long enough to permit the shuttle plates to start inwards, each with the next successive battery plate and to carry that plate far enough for the leading edge of the battery plate to pass inwards beyond the associated retaining dog 102 before the dog is permitted to drop. Pivotally mounted upon the inner surface of one of the storage bins 91, as by means of a transversely extending rod 111, is a rectangular frame 112, the two sides and outer end of which engage the pins 104 of three of the retaining dogs 102. A downwardly extending bracket 113 rigid with the frame 112 engages the pin 104 of that retaining dog 102 which is mounted upon the same storage bin 91 as that which supports the pivot rod 112. Consequently, when the frame 112 and bracket 113 are swung upwards, or counter-clockwise as viewed in Figure 18, all four of the retaining dogs 102 will be lifted simultaneously. An operating lever 114 also rigid with the rod 111 extends outwards therefrom at one side of the associated storage bin 96; and to the outer end of the lever 114 a link 116 is pivoted. This link 116 extends downwards through a suitably positioned aperture in the upper platform 33 so that its lower end can be pivoted to the short end 117 of a lever 118, which is pivotally mounted upon a suitable bracket 119 rigid with the frame of the machine. The longer end 121 of the lever 118 is provided with a screw 122 and lock nut 123 therefor, the parts being so proportioned and arranged that the head of the screw 122 lies in the path of a detent 124 carried by the rack bar 61. The detent 124 engages the abutment screw 122 just before the rack bar 61 reaches its upper extreme of movement, causing the lever 118 to swing just far enough to pull the link 116 and lever 114 downwards and thereby lift all four dogs 102 just far enough for their lower ends to clear the battery plates which at that time the four shuttle plates 41 are beginning to move inwards. In this manner interference with inward movement of the battery plates by the retaining dogs 102 is prevented.

*The receiver*

The receiver onto which the plates are sorted and delivered by the shuttle mechanism is best illustrated in Figures 5 and 6. It comprises a vertically reciprocable cylindrical plunger 131 having a helical thread 133 preferably of the buttress type on its outer surface. This plunger 131 is normally supported by a plurality of nut segments 134 preferably four in number and slidable radially with respect to the plunger 131 in radially extending guideways provided by four locks 136 rigidly mounted within a housing 137 secured to the under surface of the lower platform 31. A flat leaf spring 138 bears against the outer end of each of the nut segments 134, thereby yieldably urging the nut segments 134 inwards so that their threads operatively engage their threads 133 on the outer surface of the plunger 131.

A tubular secondary housing 141 extends downwards from the housing 137; and a head 142 in the lower end of the secondary housing 141 supports a tube 143 extending rigidly upwards therefrom to the interior of the cylindrical plunger 131. The upper end of the tube 143 opens to the interior of the plunger 131 above a cup leather 144 or other suitable packing so that fluid under pressure is supplied through the tube 143, the plunger 131 will be forced upwards. Such upward motion of the plunger 131 past the nut segments 134 is readily attainable owing to the yielding nature of the springs 138 by which the nut segments 134 are pressed inwards.

The nut segments 134 and the guiding blocks 136 therefor are mounted within the housing 137 upon a disc 151 which is revolubly supported within the housing 137 upon an annular flange 152 extending inwards from the peripheral wall of the housing 137. Rigidly secured to the under surface of the disc 151 coaxially therewith is a bevel gear 153 enmeshed by a driving gear 154 carried by a horizontally disposed shaft 156 which extends through a bearing 157 in the wall of the housing 137. It is the function of the thread 133 and the nut segments 134 to lower the plunger 131 at a constant rate proportional to the rate at which plates are deposited upon the upper end of the plunger 131, it being understood that the plunger is so located that its upper end extends through an opening 161 in the lower platform 31 which is in vertical axial alignment with the central opening 36 in the upper platform 33 so that plates dropping from the shuttle plates 41 will accumulate in a pile upon the upper end of the plunger 131. The shaft 156, therefore, is rotated in that direction and at that speed which will rotate the housing 151 and the nut segments 134 therein at the proper rate to lower the ram or plunger 131 so as to keep the top of the pile 162 (see Figure 18) of plates which has accumulated upon the upper end of the plunger 131 only a short distance below the plane of operation of the lowermost shuttle plate 41 and thereby minimize the distance that the battery plates drop when released from their respective shuttle plates. As hereinabove indicated, however, raising the plunger 131 after a stack 162 of accumulated plates has been removed therefrom, thereby re-positioning the plunger for the reception of a subsequent stack of plates, is attained more rapidly than were its raising to be effected by reverse rotation of the nut segments 134. Air, under suitable pressure, is supplied to the interior tube 143 as by means of a flexible conduit 163 which leads to the lower head 142 from a suitable control valve to be described more in detail hereinbelow. Fluid thus supplied to the head 142 moves upwardly through the central tube 143 and delivered thereby to the interior of a ram or plunger 131 above the cup leather 144, thus raising the ram without rotating the nut segments 134. As this occurs, the nut segments merely ride over the thread 133 much in the nature of ratchet dogs, this action of the nut segments being facilitated by the character of the thread 133 which, as also previously mentioned, is preferably of the buttress type.

*Plate magazine and conveyor mechanism therefor*

Means are provided for conducting through the machine a sequence of magazines standing on end in step-by-step movement and for locating one magazine at a time in alignment with the axis of operation of the plate-receiving plunger 131 so that the plunger can move upwards therethrough and then gradually be lowered as hereinabove described, so that as a pile 162 of battery plates accumulates on the plunger 131, it is actually built up within the magazine by which that pile of plates is subsequently to be carried from the assembling machine.

As best illustrated in Figures 23 to 25, inclusive, each of these magazines, indicated in its entirety at 171, comprises a container of rectangular horizontal section, open at the top 172 and having a bottom wall 173 having a central opening 174 large enough to receive the upper end of the plunger 131 and thereby permit the plunger to move upwardly inside the magazine 171. In addition to the bottom wall 173, the container 171 comprises front and back walls 176 and 177, respectively. The bottom wall 173 is rigid with the back wall 177, as are also two side walls 178. The front wall 176, instead of being rigidly secured to the remainder of the magazine 171, constitutes a separate piece which, with the shorter side walls 179 which it carries, is adapted to be placed upon the remainder or back portion of the magazine 171 and releasably secured thereto so as to define a separable two-part magazine. As a guide in properly locating the two parts with respect to each other, a flange 181 is preferably secured to each of the side walls 178 of the back portion adjacent their forward edges and adapted to receive the edges of the side walls 179 between the flanges 181 and the edges of the side walls 178 when the front portion is positioned upon the back portion. Preferably a series of L-shaped slots 182 are provided in the edges of the front portion's side walls 179 within which pins 183 on the back portion are adapted to engage, thus defining bayonet joints adapted to releasably but securely retain the two sections together in operative relation, as indicated in Figures 23 and 24. Preferably the front section is provided with a vertically extending groove 184 adjacent each edge of the front wall 176, these two grooves 184 being adapted to accommodate the lugs 186 and 187, respectively, of the positive and negative battery plates as they are lowered by the plunger 131 into the magazine 171.

It will be understood, therefore, that each magazine 171 serves as a container adapted to receive a pile 162 of assembled grid plates and separator plates and to hold that pile erect until subsequently the magazine 171 is tipped over onto its back 177, after which the front 176 may be removed, thus giving easy access to the upper edges of the grid plates and the lugs 186 and 187 which extend upwards from those edges, whereby the process of "burning" the selected groups of plates together to define storage battery cell units is facilitated.

As stated, means are provided for conveying a sequence of the magazines 171 through the machine in step-by-step movement. This is accomplished by means of the horizontal conveyor mechanism, indicated in its entirety at 191, and comprising a pair of spaced, parallel endless chains 192 carried by a pair of sprockets 193 at each end of the machine. The sprockets 193 are carried by shafts 194 and 195, there being one such shaft 194 suitably journalled at each end of an elongated laterally extending trackway 196, the central portion of which is supported on the lower platform 31. The trackway 196 comprises a pair of spaced parallel rails 197 over which the links of the upper runs of the chains 192 are adapted to slide; and each of these tracks 197 is supported upon a horizontal strip 198, the inner edge of which extends inward beyond the associated rail 197 to provide a support for a succession of the magazines 171. The two chains 192 are provided with lugs 199 extending inwards therefrom, the lugs 199 on each chain being directly opposite those on the other chain and also being disposed at spaced intervals along their respective chains 192 wide enough to accommodate one of the magazines 171 therein.

Figure 2:
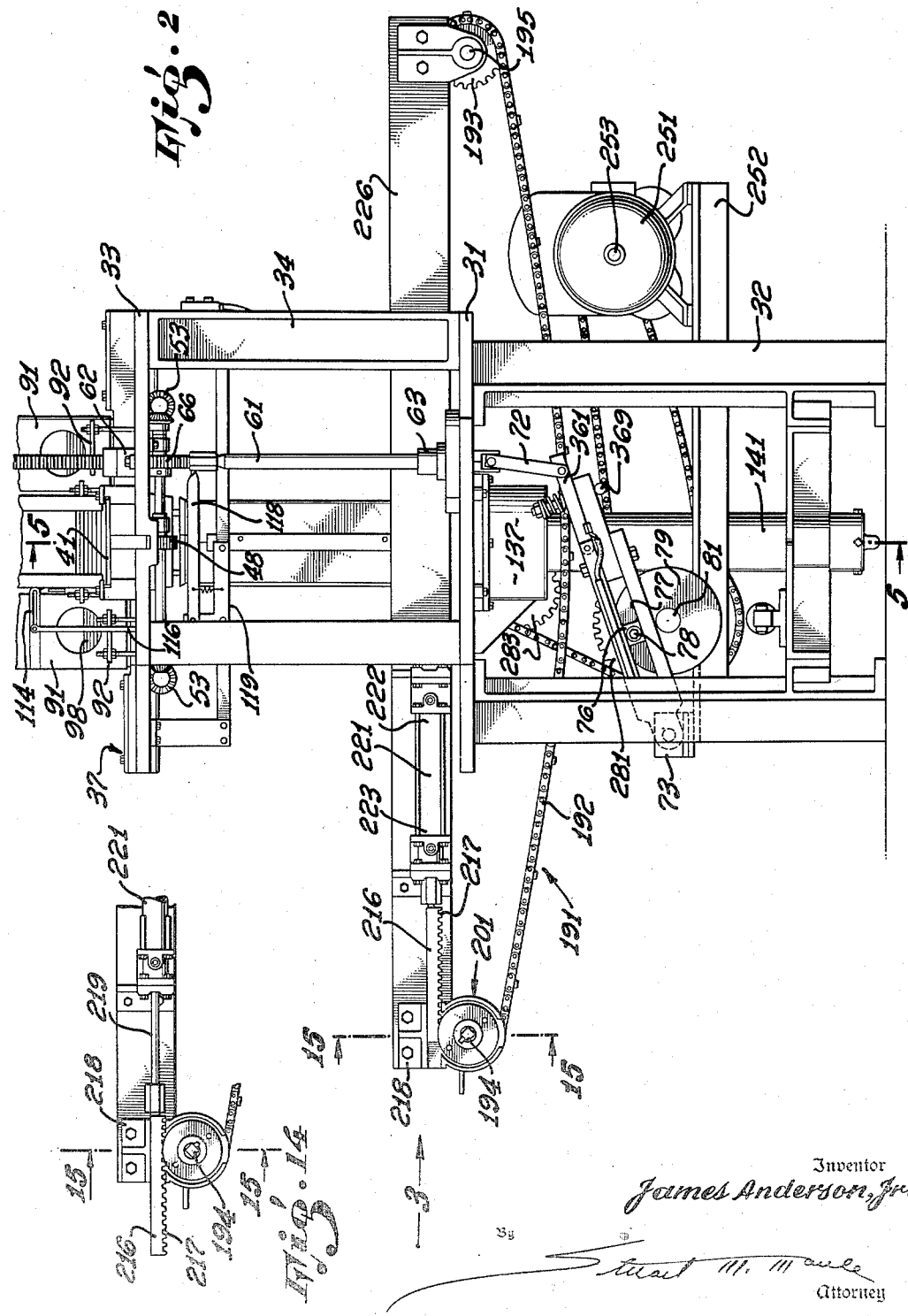
Figure 2 is a view in front elevation, taken in the direction of arrow 2 in Figure 1, and with a portion of the figure broken away to reduce its size.
Figure 16:
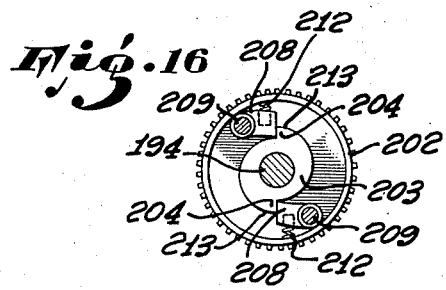
Figure 16 is a detail, vertical sectional view taken upon the line 16—16 of Figure 15, with the direction of view as indicated.
Figure 17:
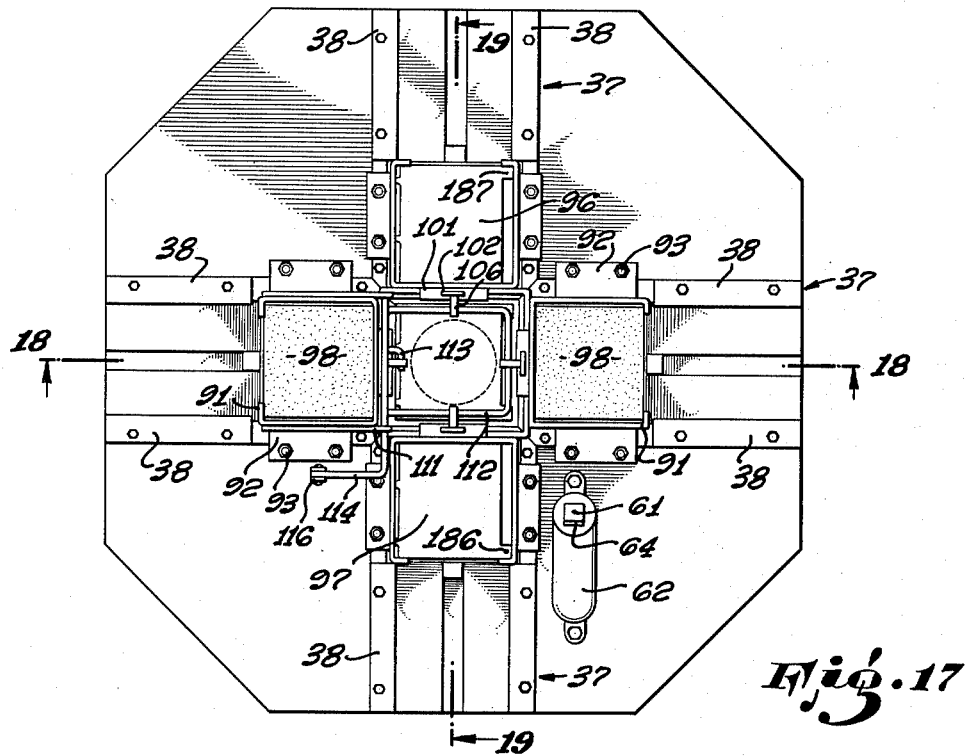
Figure 17 is an enlarged plan view of the upper platform upon which the storage bins and plate-withdrawing shuttles are operable.

The shaft at the left hand end of the machine, as viewed on Figure 2, projects laterally beyond one side of the trackway 196 to accommodate a ratchet drive, indicated in its entirety at 201, the function of which is to impart a step-by-step advancing movement to the conveyor 191. The ratchet mechanism 201 comprises a pinion gear 202 freely revoluble upon the shaft 194 and having a hub 203 having preferably a pair of ratchet teeth 204 thereon. Secured to the shaft 194 as by a key 206 is a disc 207 having a pair of ratchet dogs 208 pivotally mounted thereon as by pins 209 rigid with the disc 207. Preferably a cylindrical flange 211 is carried by the disc 207 to enclose the dogs 208 and to provide an abutment for compression springs 212, each of which is under compression between the flange 211 and one of the dogs 208, yieldably urging the dogs 208 inwards into operative engagement with the hub 203 and into the path of the ratchet teeth 204. Accordingly, when the gear 202 and its hub 203 rotate counter-clockwise, as viewed upon Figure 16, the ratchet teeth 204 engage the dogs 208 and impart corresponding rotary motion to the disc 207 and the shaft 194 upon which it is secured; but when the gear 202 rotates clockwise, the inclined surfaces 213 of the ratchet teeth 204 merely lift the dogs 208, permitting them to ride over the ratchet teeth and thus leaving the disc 207 and shaft 194 motionless during such reverse rotation of the pinion gear 202.

A rack 216 extends across preferably the top of the pinion gear 202 (see Figure 14), its teeth 217 being retained in enmeshing relation with the pinion gear 202 by means of an outwardly projecting flange 218 rigid with the trackway 196 above the laterally projecting end of the shaft 194. The rack 216 is carried by the rod 219 of a plunger (not shown) reciprocably mounted within a suitable, axially aligned air cylinder 221 rigidly mounted upon a side of the trackway 196. Consequently, when air under suitable pressure is provided to the forward end 222 of the cylinder 221, the rack 216 will be moved to the left, as viewed upon Figures 2 and 14, rotating the pinion 202 counter-clockwise and carrying with it the disc 207 and the shaft 194, as hereinabove explained. This will advance the conveyor 191, causing the upper runs of the chains 192 to move to the left a distance equal to the spacing between lugs 199, as determined by the length of the stroke of the plunger within the cylinder 221. Similarly, when fluid is supplied to the after end 223 of the cylinder 221, its plunger and the rack 216 will be retracted but without similarly reversely rotating the shaft 194 with the result that the conveyor 191 is left motionless during retractile movement of its operating rack 216.

A supply of the magazines 171 should be placed while empty and standing on end on the conveyor 191 at the right hand end of the machine, as viewed in Figure 2, so that as the conveyor advances, it will conduct the magazines 171 one at a time into alignment with the openings 36 and 161 in the upper and lower platforms 33 and 31, respectively. Means are provided for locating each magazine accurately in alignment with these openings and retaining that magazine immobile therein throughout a cycle of operation of the plunger and the shuttle mechanism. A pair of opposed upwardly extending plates 226 are carried by the trackway 196; and the flanges 227 extending inwards from their upper edges are so spaced apart that they are adapted to receive the lower end of a magazine 171 therebetween and to retain it against lateral dislodgement while the process of its being filled is carried out. An abutment rail 228 is carried by a bracket 229 (see Figure 5) rigid with one of the supporting legs 34 for the upper platform 33, this rail 228 being in position to engage a side of the magazine 171, the lower end of which is disposed between the flanges 227. Opposite the stationary rail 228 is a movable rail 230 carried by preferably a pair of supporting links 231 depending from a suitable pintle pin 232 mounted upon the under surface of the upper platform 33. A finger 233 extends horizontally from each end of the movable rail 230, these fingers 233 being spaced apart a distance sufficient to accommodate the upper end of a magazine 171 therebetween and thereby anchor the magazine directly under the upper platform opening 36 and against displacement in the direction of movement of the conveyor 191. To the movable rail 230, the rod 236 of a plunger (not shown) is secured, this plunger being operably disposed within the hydraulic cylinder 237. The rail 230 and its cooperative hydraulic cylinder 237 are so arranged that when fluid under pressure is supplied as by a conduit 238 to the forward end of the plunger 237, the rail 230 will be advanced to that position in which it is shown in full lines in Figure 5, to firmly anchor the magazine 171 then disposed between the fingers 233. When pressure within the conduit 238 is relieved and fluid under pressure is supplied as by a conduit 239 to the after end of the cylinder 237, the rail 230 will be retracted, thus releasing the magazine 171 so that it subsequently can be moved away from the position in which it has been filled, and an empty magazine substituted therefor.

*Driving mechanism*

Figure 3:
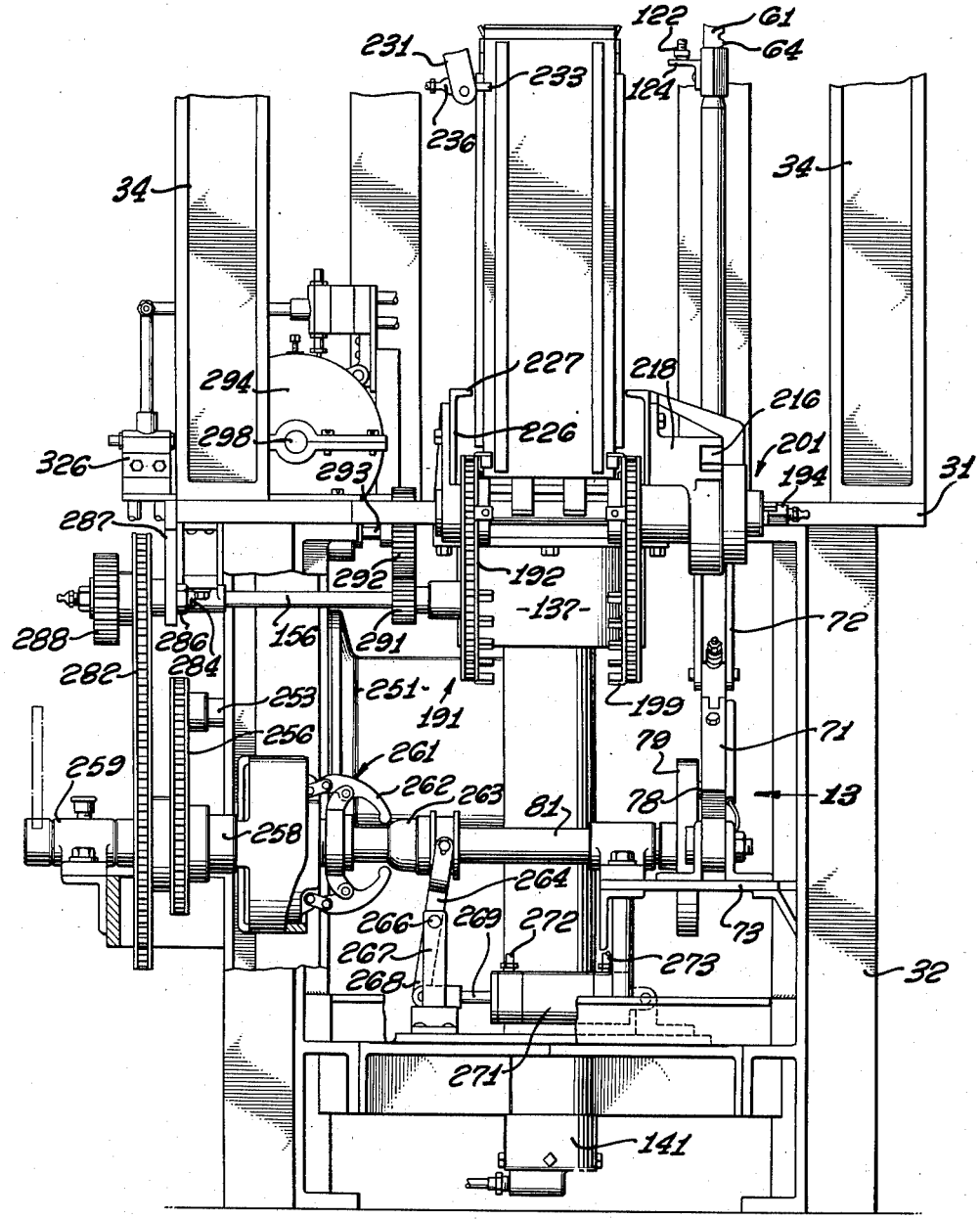
Figure 3 is an end elevation, taken in the direction of arrow 3 of Figure 1.
Figure 4:
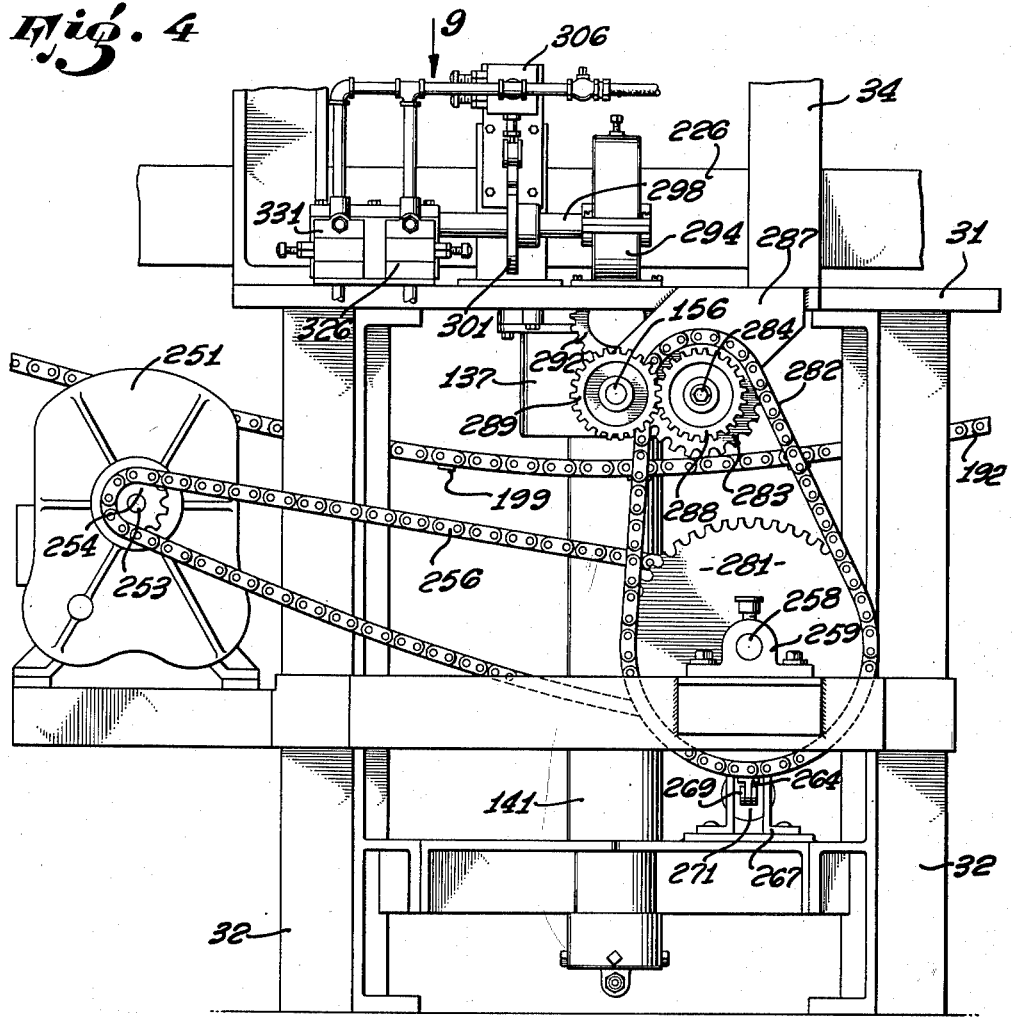
Figure 4 is an enlarged view in rear elevation, partly broken away to reduce its size, and taken in the direction of the arrow 4 of Figure 1.
Figure 15:
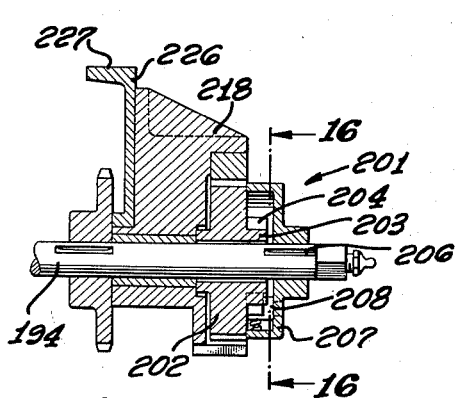
Figure 15 is an enlarged detail view in transverse vertical section, the plane of section being indicated by the lines 15—15 of Figures 2 and 14, and the direction of view by the arrows.

Preferably power for all of the moving parts of the machine is derived from a single motor 251 supported upon a lateral extension 252 of the machine's framework. The shaft 253 of the motor 251 carries a sprocket 254 which is operably connected as by a chain 256 to a sprocket 257 carried by a shaft 258 journalled in suitable bearings 259 in axial alignment with the shaft 81, the rotation of which effects reciprocatory movement of the vertical rack bar 61 of the shuttle mechanism as hereinabove described. These two shafts 258 and 81 are adapted to be optionally connected or disconnected by means of a suitable clutch, indicated in its entirety at 261 which, being of conventional construction, need not be described in detail herein other than making it clear that the clutch 261 is engaged when its dogs 262 are separated and disengaged when the dogs 262 move inwards to their Figure 3 position. A cone 263 is slidably mounted upon the shaft 81 and is adapted to be slid axially thereupon by means of a shifting fork 264 pivotally mounted as by a pin 266 upon a bracket 267 rigid with the frame of the machine. A lever 268 rigid with the shifting fork 264 and extending beyond the pivot pin 266 therefrom is connected to the rod 269 of a plunger (not shown) operably disposed within a hydraulic cylinder 271 mounted upon the frame of the machine. These parts are so arranged that when fluid is supplied as by a conduit 272 to the forward end of the cylinder 271, the rod 269 will be moved to the right, as viewed upon Figure 3, thrusting the fork 264 and the cone 263 to the left, thus separating the dogs 262 and engaging the clutch 261. Similarly, when pressure within a conduit 272 is relieved and the fluid is supplied, as by a conduit 273 to the after end of the cylinder 271, the rod 269 will be moved to the left, pulling the cone 263 out from between the dogs 262 and disengaging the clutch 261.

Also carried by the shaft 258 is a driving sprocket 281 connected by a chain 282 to a driven sprocket 283 revoluble upon a stub shaft 284 which is rigidly secured as by a nut 286 to a bracket 287 extending rigidly downwards from the lower platform 31 adjacent its after edge. Secured to the driven sprocket 283 and also revoluble upon the stub shaft 284 is a gear 288 which is enmeshed with a gear 289 rigid with the outer end of the shaft 156 by which the nut segments 134 of the mechanism for lowering the receiver plunger 131 are rotated as hereinabove described.

Also carried by the shaft 156 is the driving gear 291 enmeshed with the driven gear 292 which is carried by a shaft 293 projecting from the housing 294 of a speed reduction mechanism. Within the housing 294 the shaft 293 carries a worm 296 enmeshed with a worm wheel 297, the shaft 298 of which projects laterally from the housing 294 to operate the timing or synchronizing mechanism which includes preferably three cams 301, 302, and 303, respectively. With the cam 301, a valve 306 is associated (see Figure 10). Its plunger 307 is preferably adapted to be reciprocated by a pivotally mounted lever 308 having a roller 309 in operative engagement with the cam 301. Air or other suitable motivating fluid under pressure is supplied to the valve 306 through a suitable conduit 311. Since the construction of the valve 306 is conventional, its details need not be described herein beyond explaining that when the plunger 307 is raised, air is conducted from the inlet 311 to an outlet 312, and when the plunger 307 is lowered the inlet 311 is disconnected from the outlet conduit 312 and connected to an alternate outlet conduit 313. The outlet conduit 312 is connected by suitable tubing and fittings (not shown), both to the conduit 238 leading to the forward end of the magazine-locating cylinder 237 so as to lock the magazine then positioned under the opening 36, and also to the conduit 272 leading to the forward end of the clutch-operating cylinder 271, thus engaging the clutch 261, causing the disc 279 to rotate continuously for the duration of the period that the high point 320 of the cam 301 engages the roller 309. The extent of this high point 320 and the rate of rotation of the shaft 294 are such that the operation of the shuttle mechanism by the reciprocating rack 61 is maintained long enough to fill the magazine 171 with sufficient plates, preferably for two complete storage batteries.

After the high point 320 of the cam moves away from the roller 309, the plunger 307 drops, opening an outlet conduit 312 to the atmosphere and connecting the conduit 313 to the air supply conduit 311; and this conduit 313 is connected by suitable tubing and fittings (not shown) to the conduit 273 leading to the after end of the clutch-operating cylinder 271 and also to the conduit 239 leading to the after end of the indexing cylinder 237. Consequently, the result of lowering the plunger 307 is to stop operation of the shuttle mechanism and to retract the indexing bar 230 thus releasing the filled magazine for subsequent withdrawal from alignment with the opening 36.

The cam 302 is associated with a control valve 326 having an air inlet conduit 327 and a single air outlet conduit 328 which is connected by suitable tubing (not shown) to the conduit 163 which communicates with the interior of the plunger 131 through the central tube 143. The cam 303 is associated with a valve 331 having an air inlet conduit 332 and two air outlet conduits 333 and 334, respectively. The conduit 333 communicates with the forward end 222 of the conveyor-advancing cylinder 221, whereas the conduit 333 communicates with the after end thereof.

The cams 301, 302, and 303 are so positioned with respect to each other upon the shaft 294 that after the plunger 336 of the valve 331 has been pushed to the left, as viewed upon Figure 11, thus causing advance of the conveyor 191 and location of an empty magazine 171 below the opening 36, the cam 301 raises the plunger 307 of the valve 306, thus supplying air under pressure to the magazine index cylinder 237 to lock the magazine thus placed in position for the reception of the plunger 131 therein, and also to the clutch-operating cylinder 271 starting operation of the shuttle mechanism to deliver plates in predetermined sequence into the upper end of the magazine. Just as this occurs, the high spot 341 of the cam 302 engages the roller 342 carried by the plunger 336 of the valve 326 connecting the conduit 328 with the air supply conduit 327 and thus delivering air under pressure to the interior of the plunger 131 which is thus raised within the magazine to place its upper end adjacent the magazine's upper end in position to receive the successive groups of four plates each delivered thereto by the shuttle mechanism. Inasmuch as the shaft 156, the rotation of which causes operation of the nut segments 134, is continuously rotated, gradual lowering of the plunger 131 begins immediately air pressure within the plunger 131 is relieved by passage of the high spot 341 of the cam 303 beyond the roller 342 of the valve 331.

After the high spot 320 of the cam 301 passes out from under the roller 309, the result of which is to release the indexing bar 230 and to stop operation of the shuttle mechanism by releasing the clutch 261, the high spot 346 of the cam 303 engages the roller 347 carried by the plunger 348 of the valve 341, thus connecting the outlet conduit 333 with the supply conduit 332 and thus supply air to the forward end 222 of the conveyor-advancing cylinder 221, it being understood that the high spot 320 of the cam 301 is of sufficient extent to maintain operation of the clutch 261 long enough for the magazine 171 then located under the opening 36 to receive the desired number of plates from the shuttle mechanism. Moreover, the period of time that the plunger 307 is held in its elevated position by the high spot 320 is sufficiently long for the nut segments 144 to make a sufficient number of revolutions to lower the plunger 131 to the lower end of its stroke, thus retracting the plunger 131 clear of the magazine and depositing the plates theretofore supported thereby upon the bottom wall 173 of that magazine. All of this occurs before the high spot 346 of the cam 303 engages the roller 347 to supply air from the inlet conduit 332 to the conduit 333 and thence to the forward end 222 of the conveyor-advancing mechanism 221. The extent of this high spot 346 is of little importance inasmuch as the retractile movement of the rack 216 can occur at any time prior to the next successive advance of the conveyor since retraction of the rack 216 has no effect upon the conveyor 191.

Figure 13 illustrates a safety device which may be incorporated in the machine to prevent damage in the event a plate becomes jammed in the shuttle mechanism or any other accident occurs which places undue strain upon any one of the shuttle plates 41 or any of the operating mechanisms therefor. The lever 71 within which the cross head slipper 76 operates and to which the lower end of the rack 61 is connected by the links 72 is of compound structure, having an extension 361 pivotally secured thereto adjacent its outer end as by a pivot pin 362. It is to the outer end of this extension 361 that the legs 72 are connected as by a pivot pin 363. The extension 361 is normally retained in close contact with the main portion of the lever 71 by a spring 364 which is under compression between a washer 366 bearing against the upper surface of the extension 361 and a washer 367 retained by a nut 368 upon a bolt 369 extending through both the extension 361 and the main portion of the lever 71. Electric current is supplied to the motor 251 through electric wires 371 and 372 leading respectively to contacts 373 and 374 mounted respectively in the under surface of the extension 361 and the upper surface of the main portion of the lever 71 in such position that when the extension is in its normal position the contacts 373 and 374 are in electrical engagement with each other. However, should any accident occur, causing undue strain to be imposed upon any of the shuttle mechanisms, downward motion of the rack 61 will be resisted to such an extent that the extension 361 will be raised against the action of the spring 367, thus separating the contacts 373 and 374 and discontinuing the supply of electrical energy to the motor 251.

Figures 27 and 28 illustrate a modified form of shuttle mechanism for withdrawing grid plates and separators from the respective storage bins within which they are stored. In this modification of shuttle mechanism, the two bins 401 for the separator plates 402 are supported upon the upper platform 403 through the expedient of studs 404 rigid with and extending upwardly from the platform 403, each of these studs 404 having a pair of opposed nuts 406 adapted to be tightened against the opposite faces of an outwardly extending flange 407 rigid with the associated bin 401. Similarly, the bins 411 within which the grid plates 412 are stored are supported in erect position in alternation with the separator storage bins 401 with respect to their being arranged about the opening 413 in the center of the platform 403 through which the plates 402 and 412 drop onto the plunger 414, whereby they are to be lowered into the receiving magazines (not shown). These grid plate storage bins 411 are also supported on a similar arrangement of rigid studs 416 having nuts 417 thereon between which are clamped outwardly extending flanges 418 rigid with the bins 411.

Instead of being located closely adjacent the central delivery opening 413 of the platform 403, each of the bins 401, 411 is spaced radially outwards therefrom by a distance sufficient to accommodate a single separator plate 421 between the central opening 413 and the proximal portion of the associated bin 401 and a single grid plate 422 between the central aperture 413 and the proximal storage bin 411. Each of the bins 401, 411 is supported in slightly elevated position with respect to the platform 403 so as to permit the pusher plate 423 of a shuttle mechanism 424 to slide under the bin 401 and eject a plate out from under the bin toward the central opening 413. One such shuttle mechanism 424 is associated with each of the bins 401 and each comprises a reciprocable plate 426 to the upper surface of which the associated pusher plate 423 is rigidly secured and a rack rigidly secured below the plate 426 in position to engage one of the gears 427 which corresponds to the pinion gears 48 of the previously described modification and which may be operated in the same manner.

Instead of the shuttle mechanisms of all four storage bins operating simultaneously as in the previously described modification, this form of apparatus is intended to operate by having a single grid plate 412 and a single separator plate 402 fed simultaneously from their respective storage bins 411 and 401 on the one side of the machine, and thereafter to have a single grid plate 412 and a single separator plate 402 fed simultaneously from their respective storage bins 411 and 401, respectively, on the opposite side of the machine. Consequently, diametrically opposed shuttle mechanisms on opposite sides of the machine are designed to move in the same direction at all times. For example, that on the left hand side of Figure 27 moving radially inwards while that on the right hand side of the same figure is moving radially outwards.

Inasmuch as the pinion gears 427 are rotated in opposite directions, as explained in connection with the previously described modification, this simultaneous inward and outward movement of the shuttle mechanism in opposite sides of the machine is accomplished by providing the rack 431 associated with one of the shuttle mechanisms on the upper face of a rack bar 432 which is spaced far enough below the plate 426 of that shuttle mechanism as by a downwardly extending portion 433 of the bar 432 to engage the under side of the associated pinion 427, whereas the rack 436 of the diametrically opposed shuttle mechanism 424 is formed on the under side of a rack bar 437 which is secured directly to the under surface of the associated plate 426, with the result that this rack 436 is at an elevation high enough to engage the upper side of its associated gear 427.

The primary difference between this shuttle mechanism and that of the previously described modification lies in the fact that each shuttle mechanism, instead of carrying the plates 402 or 412, as the case might be, all the way to positions wherein they are directly above the opening 413 and then dropping the plates through the opening as the shuttles are retracted, the shuttle mechanism 424 advances the plates only far enough toward the central opening 413 to remove them from under their associated storage bin, with their leading edges not quite reaching the proximal edge of the opening 413. Thereafter, the shuttle mechanism is retracted, withdrawing the pusher plate 423 from under the plates 402 or 412 within the associated bin 401 or 411, permitting the next plate in that bin above the shuttle mechanism to drop into the plane of the associated pusher plate 423. Therefore, when the shuttle mechanism 424 is subsequently advanced, the plate 423 engages this next successive plate and pushes it out from under its storage bin. As this occurs, the leading edge of the said next successive plate engages the after edge of the plate 421, 422 previously withdrawn from its bin and deposits it in an intermediate position. Upon continued advance of the shuttle mechanism, the plate 421, 422 will be pushed between the said next succeeding plate until the former simply drops over the edge of the opening 413 and downwardly therethrough onto the upper surface of the receiver 414.

I claim:

1. A machine for assembling storage battery plates comprising a frame, a receiver mounted thereon for reciprocatory movement in a vertical path, a magazine, means for supporting said magazine and for conveying it transversely across said frame in a path intersecting said receiver's frame, said magazine having an opening therein, means for raising said receiver through said opening, means for storing plates, means for transferring plates from said storing means to said receiver within said magazine, and means for lowering said receiver and plates supported thereby within said magazine to withdraw said receiver from said magazine and deposit said plates upon said magazine.

2. A machine for assembling storage battery plates comprising a frame, a receiver mounted thereon for reciprocatory movement in a vertical path, a magazine, means for supporting said magazine and for conveying it transversely across said frame in a path intersecting said receiver's frame, said magazine having an opening therein, means for raising said receiver through said opening, a plurality of bins mounted on said frame, said bins respectively being adapted to store stacks of positive grid plates, negative grid plates, and separator plates, means for transferring plates from said storing means to said receiver within said magazine in the order in which said plates appear in a storage battery, and means for withdrawing said receiver from said magazine, said magazine having means engaging said plates to retain them within said magazine when said receiver is withdrawn therefrom.

3. A machine for assembling storage battery plates comprising a frame, a receiver mounted thereon for reciprocatory movement in a vertical path, a conveyor extending transversely of said machine and adapted to carry a plurality of magazines and to position said magazines successively within said receiver's path, means operable when a magazine is positioned within said path for raising said receiver through said magazine to a position adjacent the top thereof, means operable after plates have been placed thereon for withdrawing said receiver from said magazine, and means for retaining plates placed upon said receiver within said magazine when said receiver is withdrawn therefrom.

4. A machine for assembling storage battery plates comprising a frame, a receiver mounted thereon for reciprocatory movement in a vertical path, a conveyor extending transversely of said machine and adapted to carry a plurality of magazines and to position said magazines successively within said receiver's path, means operable when a magazine is positioned within said path for raising said receiver through said magazine to a position adjacent the top thereof, means for storing a supply of positive grid plates, negative grid plates, and separator plates, means for transferring a predetermined number of each of said plates from said storing means and depositing them upon said receiver within said magazine in the order in which said plates appear in a storage battery, and means operable synchronously with said transferring means for lowering said receiver a distance substantially corresponding to the combined thickness of said predetermined number of plates for each operation of said transferring means.

5. A machine for assembling storage battery plates comprising a frame, a receiver mounted thereon for reciprocatory movement in a vertical path, a conveyor extending transversely of said machine and adapted to carry a plurality of magazines and to position said magazines successively within said receiver's path, means operable when a magazine is positioned within said path for raising said receiver through said magazine to a position adjacent the top thereof, means for storing a supply of positive grid plates, negative grid plates, and separator plates, means for transferring a predetermined number of each of said plates from said storing means and depositing them upon said receiver within said magazine in the order in which said plates appear in a storage battery, means operable synchronously with said transferring means for lowering said receiver a distance substantially corresponding to the combined thickness of said predetermined number of plates for each operation of said transferring means, and means for retaining plates deposited upon said receiver within said magazine when said receiver has been lowered far enough to withdraw it from said magazine.

6. A machine for assembling storage battery plates comprising a frame, a receiver mounted thereon for reciprocatory movement in a vertical path, a conveyor extending transversely of said machine and adapted to carry a plurality of magazines and to position said magazines successively within said receiver's path, means operable when a magazine is positioned within said path for raising said receiver through said magazine to a position adjacent the top thereof, means for storing a supply of positive grid plates, negative grid plates, and separator plates, means for transferring a predetermined number of each of said plates from said storing means and depositing them upon said receiver within said magazine in the order in which said plates appear in a storage battery, means operable synchronously with said transferring means for lowering said receiver a distance substantially corresponding to the combined thickness of said predetermined number of plates for each operation of said transferring means, means for retaining plates deposited upon said receiver within said magazine when said receiver has been lowered far enough to withdraw it from said magazine, and means operable after said receiver has been withdrawn from said magazine for advancing said conveyor.

7. A machine for assembling storage battery plates comprising a frame, a receiver mounted thereon for reciprocatory movement in a vertical path, a conveyor extending transversely of said machine and adapted to carry a plurality of magazines and to position said magazines successively within said receiver's path, means operable when a magazine is positioned within said path for raising said receiver through said magazine to a position adjacent the top thereof, a pair of storage bins carried by said frame, said bins respectively being adapted to store a supply of positive grid plates and a supply of negative grid plates, a second pair of storage bins, each of said bins of said second pair being adapted to store a supply of separator plates, means associated with each of said bins for successively withdrawing one plate at a time therefrom and conveying it to a position above said receiver, means for removing each plate from its associated withdrawing means as said withdrawing means returns from above said receiver whereby the plate conveyed thereby is released therefrom to said receiver, means operable synchronously with said withdrawing means for lowering said receiver, and means for retaining plates deposited on said receiver within said magazine when said receiver has been lowered far enough to withdraw it from said magazine.

8. A machine for assembling storage battery plates comprising a frame, a receiver mounted thereon for reciprocatory movement in a vertical path, a conveyor extending transversely of said machine and adapted to carry a plurality of magazines and to position said magazines successively within said receiver's path, means operable when a magazine is positioned within said path for raising said receiver through said magazine to a position adjacent the top thereof, a pair of storage bins carried by said frame, said bins respectively being adapted to store a supply of positive grid plates and a supply of negative grid plates, a second pair of storage bins, each of said bins of said second pair being adapted to store a supply of separator plates, means associated with each of said bins for successively withdrawing one plate at a time therefrom and conveying it to a position above said receiver, means for removing each plate from its associated withdrawing means as said withdrawing means returns from above said receiver whereby the plate conveyed thereby is released therefrom to said receiver, each of said withdrawing means being operable horizontally in a plane at an elevation different from that within which any other of said withdrawing means operates, means for actuating all of said withdrawing means simultaneously, means operable synchronously with said withdrawing means for lowering said receiver, and means for retaining plates deposited on said receiver within said magazine when said receiver has been lowered far enough to withdraw it from said magazine.

9. A machine for assembling storage battery plates comprising a frame, a receiver mounted thereon for reciprocatory movement in a vertical path, a conveyor extending transversely of said machine and adapted to carry a plurality of magazines and to position said magazines successively within said receiver's path, means operable when a magazine is positioned within said path for raising said receiver through said magazine to a position adjacent the top thereof, a pair of storage bins carried by said frame, said bins respectively being adapted to store a supply of positive grid plates and a supply of negative grid plates, a second pair of storage bins, each of said bins of said second pair being adapted to store a supply of separator plates, means associated with each of said bins for successively withdrawing one plate at a time therefrom and conveying it to a position above said receiver, means for removing each plate from its associated withdrawing means as said withdrawing means returns from above said receiver whereby the plate conveyed thereby is released therefrom to said receiver, each of said withdrawing means being operable horizontally in a plane at an elevation different from that within which any other of said withdrawing means operates and said planes being in the same sequence from the uppermost to the lowermost thereof as that in which said plates appear in a storage battery, means for actuating all of said withdrawing means simultaneously, means operable synchronously with said withdrawing means for lowering said receiver, and means for retaining plates deposited on said receiver within said magazine when said receiver has been lowered far enough to withdraw it from said magazine.

JAMES ANDERSON, Jr.

REFERENCES CITED

The following references are of record in the file of this patent:

UNITED STATES PATENTS

| Number | Name | Date |
|---|---|---|
| 496,221 | Gibon | Apr. 25, 1893 |
| 1,966,878 | Bluzat | July 17, 1934 |
| 2,324,523 | Lund | July 20, 1943 |